United States Patent
Kim et al.

(10) Patent No.: US 9,210,157 B1
(45) Date of Patent: *Dec. 8, 2015

(54) SECURE ACCESS TO MOBILE APPLICATIONS

(71) Applicant: MOBILE IRON, INC., Mountain View, CA (US)

(72) Inventors: Mansu Kim, Cupertino, CA (US); Joshua Sirota, Los Altos, CA (US); Suresh Kumar Batchu, Milpitas, CA (US)

(73) Assignee: MOBILE IRON, INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/137,848

(22) Filed: Dec. 20, 2013

Related U.S. Application Data

(60) Provisional application No. 61/745,350, filed on Dec. 21, 2012.

(51) Int. Cl.
*G06F 7/04* (2006.01)
*H04L 29/06* (2006.01)

(52) U.S. Cl.
CPC .................................. *H04L 63/0815* (2013.01)

(58) Field of Classification Search
CPC .................................................. H04L 63/0815
USPC ............................................................. 726/8
See application file for complete search history.

(56) References Cited

U.S. PATENT DOCUMENTS

| | | |
|---|---|---|
| 2009/0328186 A1 | 12/2009 | Pollutro et al. |
| 2010/0242097 A1* | 9/2010 | Hotes et al. ........................ 726/4 |
| 2010/0299152 A1 | 11/2010 | Batchu et al. |
| 2012/0291102 A1* | 11/2012 | Cohen ............................... 726/4 |
| 2014/0082706 A1 | 3/2014 | Banford |

OTHER PUBLICATIONS

U.S. Appl. No. 14/137,752, Office Action mailed Feb. 25, 2014.
U.S. Appl. No. 14/137,752, Office Action mailed Aug. 25, 2014.

* cited by examiner

*Primary Examiner* — Mohammad W Reza
(74) *Attorney, Agent, or Firm* — Van Pelt, Yi & James LLP

(57) ABSTRACT

An enterprise zone is disclosed. An attempt to use an application in a zone of applications may be received. The application may find that the zone of applications is locked. A passcode may be requested to unlock the zone of applications. A received passcode may be validated. An application bus may be updated. Use of the application may be allowed.

13 Claims, 3 Drawing Sheets

SECURE ACCESS TO MOBILE APPLICATIONS

CROSS REFERENCE TO OTHER APPLICATIONS

This application claims priority to U.S. Provisional Patent Application No. 61/745,350 entitled ENTERPRISE ZONE filed Dec. 21, 2012 which is incorporated herein by reference for all purposes.

BACKGROUND OF THE INVENTION

Today most of the enterprises are building multiple enterprise apps, for example, ERP, CRM, Factory automation to reserving conference rooms. But mobile devices can be shared with other employees, customers, family members and friends, Enterprises want to restrict access to content for apps to authenticated and authorized employee users only. Also, Enterprises don't want to make this difficult to use by their employee by asking each and every app to authenticate and authorize the user separately before use.

DETAILED DESCRIPTION

Techniques are disclosed to provide on a mobile device an "Enterprise zone" which provides secure sharing of enterprise authentication and authorization between management agent apps and other enterprise apps, so user only need to provide his authenticated and authorization once for all the apps in the enterprise zone.

In various embodiments, an Enterprise Zone is provided on a mobile device, which will provide user authentication, authorization, and lock zone to apps developed for the Zone. Each authentication will validate the user's credential with the enterprise authentication directory and store authentication cookie with expiration based on authentication policy. After authentication, a list of authorized apps will be updated, for example based on configuration information provided to the mobile device by a mobile device management or other server. A "lock zone" command will lock the zone apps, so the user can share the device with other employees, customers, family members and friends, without such other users having access to apps and/or associated app data for apps in the Enterprise Zone. The user can unlock the zone with the zone passcode and continue previous enterprise zone session.

VSP stands for Virtual Smartphone Platform by MobileIron. In some embodiments, all managed mobile devices' configuration, policies and apps are managed from the VSP or a similar management node. MobileIron clients (e.g., trusted agent on mobile device) connect to VSP on a periodic basis to update the device status as well as get the new configuration and policies.

Figure 1:
FIG. 1 is a table including apps that may be installed on a mobile device according to various embodiments.

FIG. 1 is a table including apps that may be installed on a mobile device according to various embodiments. The table of apps may be installed, for example, and the Enterprise Zone disclosed herein provided at least in part by the technique illustrated below.

Figure 2:
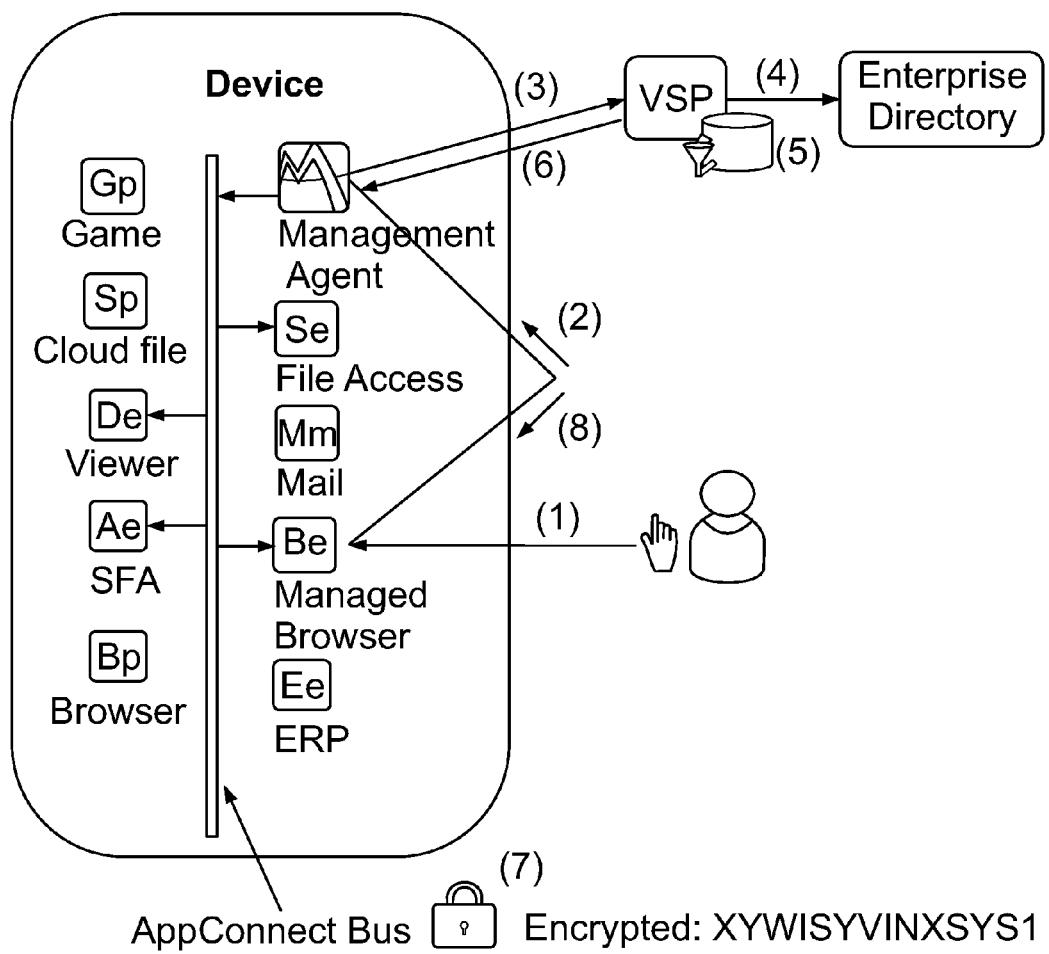
FIG. 2 is a block diagram illustrating embodiments of an enterprise zone.

FIG. 2 is a block diagram illustrating embodiments of an enterprise zone.

(1) User clicks enterprise zone app (for example, managed browser)

(2) Enterprise zone app detects that enterprise zone is not authenticated yet, it forwards user to management agent for authentication (3) User types in enterprise credential to management agent's enterprise zone authentication screen; management agent transfers this to VSP with secure protocol (4) VSP will validate user's credential with enterprise directory (5) VSP look up app authorization for the user and applicable policies based on device status (for example, jailbreak status or application installation status)

(6) Management agent receives the authentication and authorization status from VSP (7) Management agent saves authentication, authorization, and Lock info to AppConnect bus in encrypted format. For example: {authenticationExpire=1343071545,AuthorizedApps=[{appid=company.files.Se}, {appid=company.browser.Be}, {appid=company.SFA.Ae}, {appid=company.viewer.De}], zoneLock=false}

(8) Management agent will forward user back to enterprise zone app which the user launched first call authentication. (for example, managed browser). Enterprise app will validate the authentication and authorization information based on the information shared on the AppConnect bus. Now user can use enterprise apps (for example, browsing company intranet web sites)

In above case, even if ERP app has embedded enterprise zone library, user will not be allowed to use this app because user was not authorized to use app (based on authorized apps list).

Figure 3:
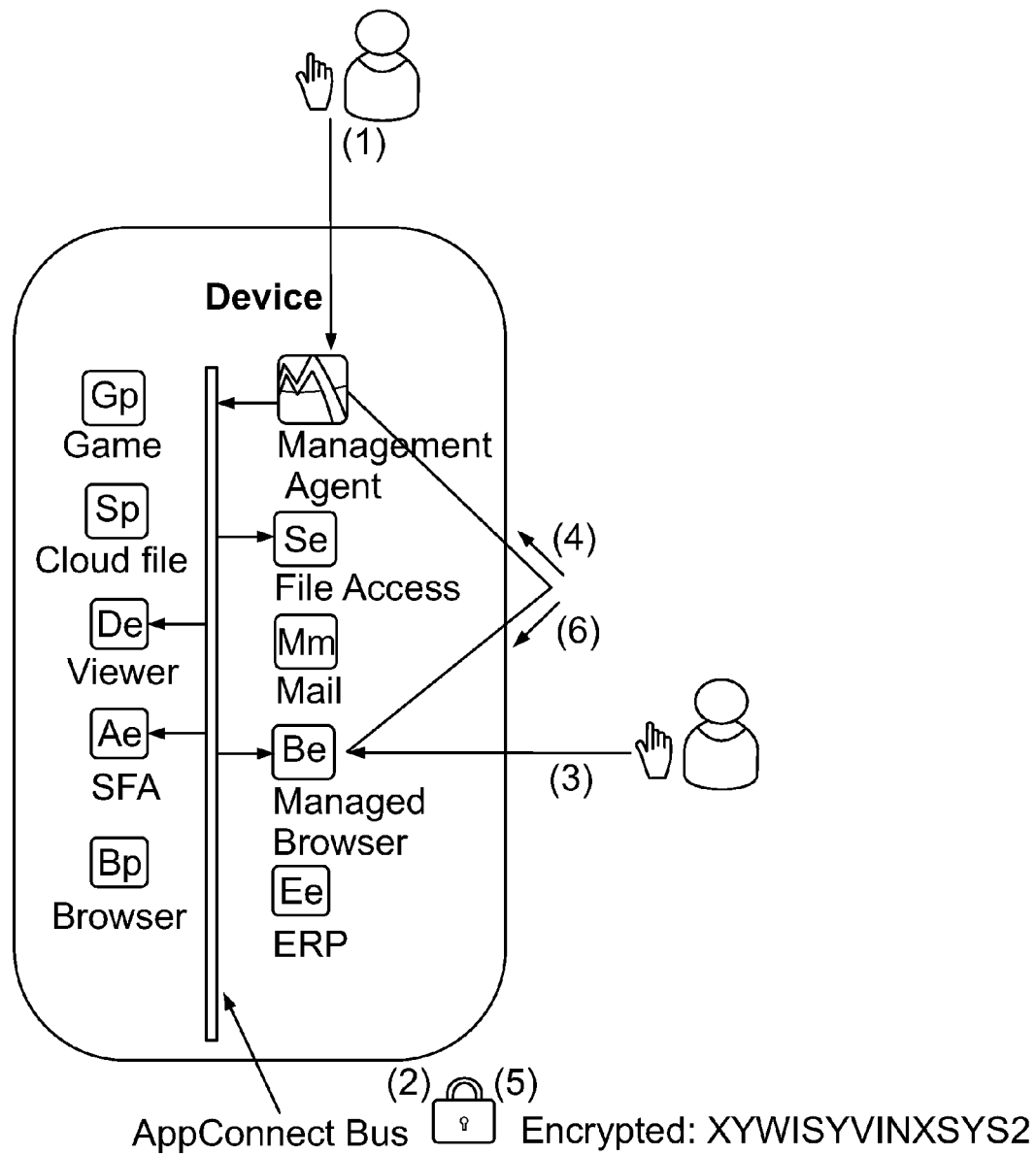
FIG. 3 is a block diagram illustrating embodiments of an enterprise zone.

FIG. 3 is a block diagram illustrating embodiments of an enterprise zone.

Lock Zone Case:

(1) User can set the unlock zone passcode as part of the setup which can unlock the enterprise zone so apps can run.

(2) To lock the zone user clicks "Lock zone" command in Management Agent which will store this lock status to AppConnect bus in encrypted format. For example: {authenticationExpire=1343071545,AuthorizedApps= [{appid=company.files.Se}, {appid=company.browser.Be}, {appid=company.SFA.Ae}, {appid=company.viewer.De}], zoneLock=true}

(3) User try to use enterprise zone apps (for example, Managed browser), (4) Browser find that zone is locked, so user will be forwarded to Management agent which will eventually ask the user to unlock the zone using unlock passcode.

(5) After user successfully validate unlock passcode, Management agent will update AppConnect Bus in encrypted format. For example: {authenticationExpire=1343071545, AuthorizedApps=[{appid=company.files.Se}, {appid=company.browser.Be}, {appid=company.SFA.Ae}, {appid=company.viewer.De}], zoneLock=false}

(6) Management agent will forward back user to enterprise zone app which called unlock in the first place. (for example, Managed browser). Now user can use enterprise zone apps.

In some embodiments, an administrator can set up an idle timeout for Enterprise Zone to lock automatically after the time expires. Idle timeout is where no enterprise app is active within a set period. This timeout will be configured in VSP as part of policy which gets delivered to management agent on the mobile device.

What is claimed is:

1. A method, comprising:
receiving, by a mobile device, a first input corresponding to an attempt to use an application in a zone of protected applications;
finding, by the application, that the zone of protected applications is locked;
requesting, by the mobile device, a passcode to unlock the zone of protected applications;
validating a received passcode;
updating an application bus of the mobile device;
allowing use of the application;
receiving, by the mobile device, a second input corresponding to a request to lock the zone of protected applications; and
in response to receiving the second input, locking the zone of protected applications such that an application in the zone of protected applications is inaccessible and an application outside the zone of protected applications remains accessible.

2. The method of claim 1, wherein the updating of the application bus of the mobile terminal comprises:
saving one or more of authentication information, authorization information, and lock information to the application bus in an encrypted format.

3. The method of claim 2, wherein a management agent that is installed on the mobile device and that manages the application in the zone of protected applications saves the one or more of authentication information, authorization information, and lock information to the application bus of the mobile terminal.

4. The method of claim 1, wherein the locking of the zone of protected applications comprises:
saving a lock status to the application bus of the mobile device in an encrypted format.

5. The method of claim 4, wherein a management agent that is installed on the mobile device and that manages the application in the zone of protected applications saves the lock status to the application bus.

6. A system, comprising:
a processor; and
a memory coupled with the processor, wherein the memory is configured to provide the processor with instructions which when executed cause the processor to:
receive a first input corresponding to an attempt to use an application in a zone of protected applications;
find, by the application, that the zone of protected applications is locked;
request a passcode to unlock the zone of protected applications;
validate a received passcode;
update an application bus;
allow use of the application;
receive, by the mobile device, a second input corresponding to a request to lock the zone of protected applications; and
in response to receiving the second input, lock the zone of protected applications such that an application in the zone of protected applications is inaccessible and an application outside the zone of protected applications remains accessible.

7. The system of claim 6, wherein the updating of the application bus of the mobile terminal comprises:
saving one or more of authentication information, authorization information, and lock information to the application bus in an encrypted format.

8. The system of claim 7, wherein the memory further comprises a management agent that is installed thereon and that manages the application in the zone of protected applications saves the one or more of authentication information, authorization information, and lock information to the application bus of the mobile terminal.

9. The system of claim 6, wherein the locking of the zone of protected applications comprises:
saving a lock status to the application bus of the mobile device in an encrypted format.

10. The system of claim 9, wherein the memory further comprises a management agent that is installed thereon and that manages the application in the zone of protected applications saves the lock status to the application bus.

11. A computer program product, the computer program product being embodied in a tangible non-transitory computer-readable storage medium and comprising computer instructions, which when executed, cause a computer to perform steps of:
receiving a first input corresponding to an attempt to use an application in a zone of protected applications;
finding, by the application, that the zone of protected applications is locked;
requesting a passcode to unlock the zone of protected applications;
validating a received passcode;
updating an application bus;
allowing use of the application;
receiving, by the mobile device, a second input corresponding to a request to lock the zone of protected applications; and
in response to receiving the second input, locking the zone of protected applications such that an application in the zone of protected applications is inaccessible and an application outside the zone of protected applications remains accessible.

12. The computer product recited in claim 11, further comprising computer instructions for:
saving one or more of authentication information, authorization information, and lock information to the application bus in an encrypted format.

13. The computer product recited in claim 12, further comprising computer instructions for:
saving a lock status to the application bus of the mobile device in an encrypted format.

* * * * *